Dec. 27, 1938.   W. J. WOODS   2,141,456
METHOD OF DRAWING GLASS TUBING
Filed July 7, 1936

INVENTOR.
WILLIAM J. WOODS
BY Dorsey Cole
ATTORNEYS.

Patented Dec. 27, 1938

2,141,456

UNITED STATES PATENT OFFICE 2,141,456

METHOD OF DRAWING GLASS TUBING

William J. Woods, Corning, N. Y., assignor to Corning Glass Works, Corning, N. Y., a corporation of New York Application July 7, 1936, Serial No. 89,397

2 Claims. (Cl. 49—83.1)

This invention relates to a method of and means for producing drawn glass and more particularly to the production of small bore tubing such as used in the manufacture of thermometers, and the like.

An object of the invention is to produce tubing the bore of which has a non-circular configuration.

Among its features my invention embodies the use of a drawing nipple of a configuration suitable for producing the desired cross-sectional bore configuration of the tubing as the draw takes place, together with the use of apparatus for retaining substantially the shape of the bore imparted to the tubing by the nipple or any variation of such shape which the bore assumes due to surface tension on the walls thereof as the draw takes place.

The invention may be considered as an improvement on the methods and apparatus disclosed in my prior United States Patent Numbers 1,829,429 and 1,920,336, granted October 27, 1931, and August 1, 1933, respectively.

Figure 1:
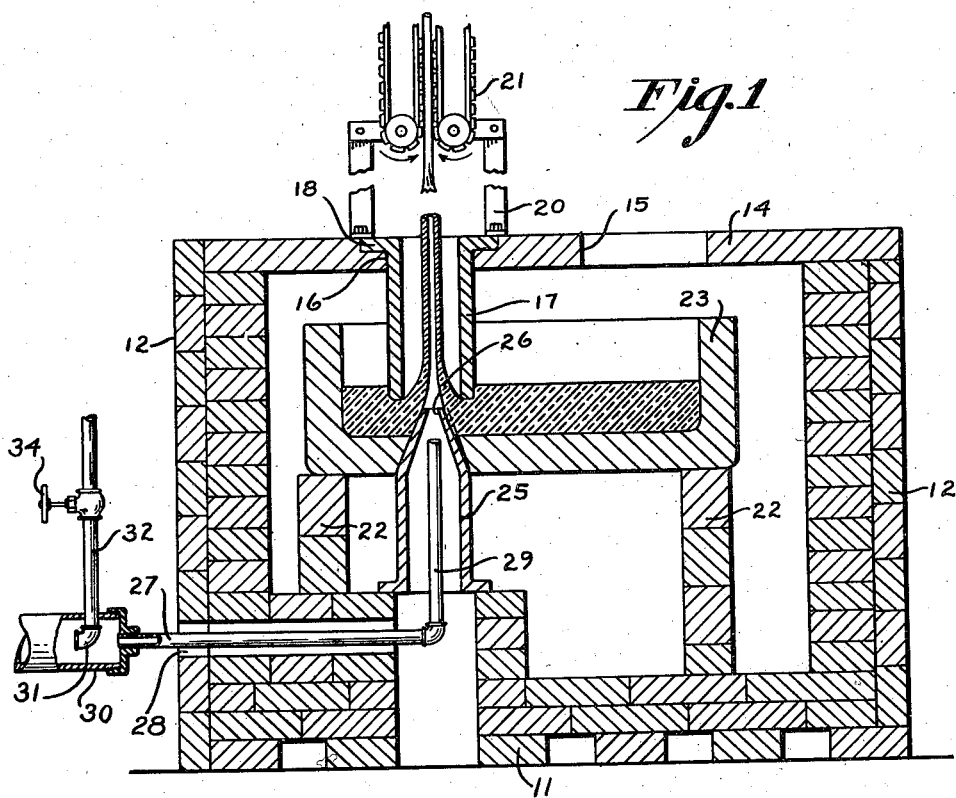
Fig. 1 is a side sectional elevation of an apparatus embodying my invention and adapted to carry out the process herein described.
Figure 2:
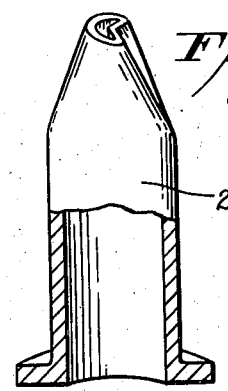
Fig. 2 is an enlarged perspective view, partly in section, of one configuration of nipple used in carrying out the invention.
Figure 3:
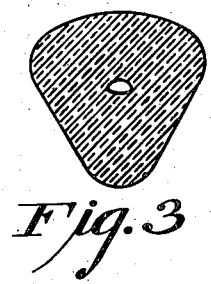
Fig. 3 is an enlarged cross-sectional view of a piece of tubing produced by the use of a drawing nipple such as illustrated in Fig. 2, without the assistance of suction apparatus.
Figure 4:
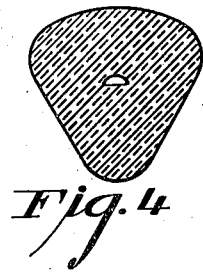
Figs. 4 and 5 are enlarged cross-sectional views of pieces of tubing produced by use of this same nipple with the aid of suction apparatus.
Figure 5:
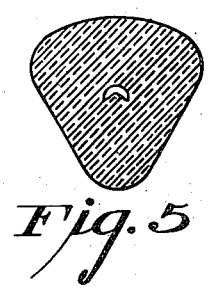

Referring to the drawing in detail, a furnace, consisting of a bottom 11, and side walls 12, is provided with a cover block 14 which is provided with a filling opening 15 and a work opening 16, the latter being designed to receive a shaping sleeve or lenser 17 which is supported by an integrally formed annular outstanding flange 18, and which determines the outside configuration of the tubing drawn. In the present disclosure the shaping sleeve is designed to produce the conventional form of lens front tubing, as illustrated by Figs. 3, 4 and 5.

Mounted on a suitable frame 20 directly above the work opening 16 is a tractor 21 by means of which the drawing of glass is effected.

Supported in spaced relation to the furnace bottom 11 on blocks 22 is a pot 23 containing a supply of molten glass from which the tubing is to be made. Directly beneath the work opening 16 the bottom of the pot is provided with an opening for the reception of a refractory nipple 25 having a central opening 26, and having an external contour depending upon the shape of the bore of tubing it is desired to produce.

An air pipe 27 passes through a suitable opening 28 in one side of the side walls 12 of the furnace and is provided with a vertical run 29 which terminates directly beneath the opening 26 in the nipple 25. At a point outside the furnace, pipe 27 is provided with an enlarged pipe 30 containing an elbow 31 secured to the bottom end of an air supply line 32 and which elbow, when positioned as illustrated, directs air away from the furnace to create a suction or partial vacuum at the nipple opening 26.

In operation, molten glass is deposited in the pot 23 through the opening 15 to the required level, it being understood that the glass is kept in its molten state by suitable burners (not shown) and by which the temperature in the interior of the furnace is properly maintained. With the nipple 25 completely submerged in the molten glass, a bait is then let down through the shaping sleeve or lenser 17 until it contacts with the glass, directly above the nipple 25. Upon drawing the bait upwardly it is obvious that the glass will follow and may be passed into the tractor 21 which will then continue the draw.

In drawing glass tubing due to the surface tension of the glass the natural tendency is for the bore to take on a circular shape irrespective of the configuration imparted to it by the drawing nipple used. In the past, therefore, it has been the practice to so shape the external surface of the leaving end of the drawing nipple as to produce the desired bore shape, for example, that of a segment of a circle or crescent, and by then applying air to the opening of the nipple the inner surface of the bore has been cooled and quickly set so that substantially the shape imparted to it by the nipple is retained.

It has now been found, however, that a much more accurate control of the bore shape can be had by using an appropriately shaped nipple and by maintaining therein a controlled partial vacuum. I have found this to be very effective in opposing the surface tension which tends to change the shape imparted to the bore in the glass by the drawing nipple. By a proper regulation of the degree of exhaustion the general shape of bore (Fig. 5) imparted by the nipple, or any subsequent shape of bore resulting from the effect of surface tension on the wall of the bore may be retained, as will be more fully brought out hereinafter.

In order to better describe the invention I have illustrated the nipple 25 as having an external configuration which, without the aid of suction apparatus, produces tubing with a crescent shape bore (Fig. 5), modified by the surface tension of the glass during the draw, to a shape having a cross-section which takes the form of an ellipse with one side thereof somewhat flattened, as illustrated by Fig. 3. However, by slightly opening of an air supply valve 34 and with the open side of elbow 31 directed away from the furnace, sufficient suction will be created in the bore of the tubing as it leaves the nipple 25 that it will arrest the tendency of the surface tension to produce an elliptical shape of bore just before the initially concave surface of the bore can become convex, so that the bore shape attains that of a segment of a circle as illustrated by Fig. 4. It will be apparent that as the degree of exhaustion of the bore is increased the effect of the surface tension on the walls thereof is decreased. It follows, therefore, that by proper adjustment of the valve 34 the effect of the surface tension of the glass can be so governed that the bore of the tubing being formed can be selectively made to retain the shape illustrated in Fig. 5 or any of the infinite number of crescent shapes through which it passes before attaining the shape illustrated in Fig. 4.

There may also be occasions when it is desired that the tubing produced retain a bore shape requiring the application of air under pressure to the opening 26 of the nipple 25. In such case the necessary air for setting the glass may be supplied thereto by simply turning the elbow 31 one-half revolution to enable air supplied by pipe 32 to be forced through pipes 27 and 29 and nipple opening 26.

While in the foregoing there has been shown and described the preferred embodiment of my invention, it is to be understood that minor changes in the details of construction, and especially in the configuration of the drawing nipple, may be resorted to without departing from the spirit and scope of the invention.

Having thus described my invention, what I claim as new and desire to protect by Letters Patent is:

1. The method of making glass capillary tubing having a flat sided bore which comprises drawing a tube of glass upwardly from a molten bath over and in contact with a hollow shaping member of generally circular cross section having a V-shaped indentation in one side thereof extending to its tip, and limiting the effect of surface tension in the bore of said tube to that required to change the V-shape imparted to the bore wall by the shaping member to planar shape by creating a partial vacuum in the bore during the drawing of the tube.

2. The method of making glass capillary tubing having a flat sided bore which comprises establishing a bath of molten glass over and around a hollow shaping member of generally conical configuration having a V-shaped groove in one side thereof, drawing glass upwardly from the bath about said member to form a tube having a V-shaped bore, simultaneously applying suction to the interior of said shaping member and tube to insure entrance of said glass into said V-shaped groove and limiting the effect of surface tension in the bore of said tube to that required to change the V-shaped wall of the bore to planar shape by controlling the degree of vacuum in the bore during the drawing of the tube.

WILLIAM J. WOODS.